United States Patent
Klein et al.

(10) Patent No.: US 10,458,350 B2
(45) Date of Patent: Oct. 29, 2019

(54) METHOD FOR ASCERTAINING AN ACCURACY OF A TORQUE TRANSMITTED BY A BELT-DRIVEN STARTER GENERATOR OF AN INTERNAL COMBUSTION ENGINE TO THE INTERNAL COMBUSTION ENGINE

(71) Applicants: Robert Bosch GmbH, Stuttgart (DE); SEG Automotive Germany GmbH, Stuttgart (DE)

(72) Inventors: Benjamin Klein, Bietigheim-Bissingen (DE); Tobias Trzebiatowski, Stuttgart (DE); Andreas Greis, Stuttgart (DE); Bernd Schroeder, Renningen (DE); Istvan Deak, Ludwigsburg (DE); Mario Kaepple, Oehringen (DE); Martin Henger, Tamm (DE)

(73) Assignees: Robert Bosch GmbH, Stuttgart (DE); SEG Automotive Germany GmbH, Stuttgart (DE)

( * ) Notice: Subject to any disclaimer, the term of this patent is extended or adjusted under 35 U.S.C. 154(b) by 49 days.

(21) Appl. No.: 15/745,885

(22) PCT Filed: Jun. 15, 2016

(86) PCT No.: PCT/EP2016/063688
§ 371 (c)(1),
(2) Date: Jan. 18, 2018

(87) PCT Pub. No.: WO2017/012785
PCT Pub. Date: Jan. 26, 2017

(65) Prior Publication Data
US 2018/0216557 A1    Aug. 2, 2018

(30) Foreign Application Priority Data

Jul. 22, 2015   (DE) .................. 10 2015 213 768

(51) Int. Cl.
*F02N 11/04* (2006.01)
*F02D 41/08* (2006.01)
(Continued)

(52) U.S. Cl.
CPC ............ *F02D 41/083* (2013.01); *F02B 67/06* (2013.01); *F02D 41/1497* (2013.01);
(Continued)

(58) Field of Classification Search
CPC .... F02B 67/06; F02D 41/083; F02D 41/1497; F02D 2200/101; F02D 2200/1012;
(Continued)

(56) References Cited

U.S. PATENT DOCUMENTS 6,784,563 B2 * 8/2004 Nada ................... F02N 11/0859
290/40 C
7,275,518 B1 * 10/2007 Gartner ............... F02D 41/0002
123/406.23
(Continued)

FOREIGN PATENT DOCUMENTS

DE        19704153 A1    8/1998
DE      102009055062 A1    6/2011
(Continued)

OTHER PUBLICATIONS

International Search Report dated Sep. 22, 2016, of the corresponding International Application PCT/EP2016/063688 filed Jun. 15, 2016.

*Primary Examiner* — Erick R Solis
(74) *Attorney, Agent, or Firm* — Gerard Messina; Norton Rose Fulbright US LLP

(57) ABSTRACT

A method for ascertaining an accuracy of a torque transmitted by a belt-driven starter generator of an internal combustion engine to the internal combustion engine, the method being similar to a learning operation or a calibration of the
(Continued)

actual torque of the starter generator with respect to a setpoint torque, includes: in an idling instance of the internal combustion engine, controlling the belt-driven starter generator to transmit a specified test torque to the internal combustion engine and decreasing the torque of the internal combustion engine by the specified test torque; determining and evaluating a speed variable, which is a function of a speed of the internal combustion engine; and deducing the torque accuracy from the evaluated speed variable.

10 Claims, 2 Drawing Sheets

(51) Int. Cl.
    *F02D 41/14*     (2006.01)
    *F02N 11/10*     (2006.01)
    *F02N 15/08*     (2006.01)
    *F02B 67/06*     (2006.01)
    *F16H 7/12*     (2006.01)
    *F16H 7/08*     (2006.01)

(52) U.S. Cl.
    CPC ............ *F02N 11/04* (2013.01); *F02N 11/108* (2013.01); *F02N 15/08* (2013.01); *F16H 7/12* (2013.01); *F16H 7/1281* (2013.01); *F02D 2200/101* (2013.01); *F02D 2250/24* (2013.01); *F02N 2200/022* (2013.01); *F02N 2200/042* (2013.01); *F02N 2300/104* (2013.01); *F16H 2007/0808* (2013.01); *F16H 2007/0865* (2013.01); *F16H 2007/0874* (2013.01); *F16H 2007/0893* (2013.01)

(58) Field of Classification Search
    CPC .... F02D 2250/24; F02N 11/04; F02N 11/108; F02N 2200/022; F02N 2200/042; F02N 2300/104
    USPC ................... 73/114.59; 123/339.16, 339.18; 180/65.28, 65.285
    See application file for complete search history.

(56) References Cited

U.S. PATENT DOCUMENTS

| | | | |
|---|---|---|---|
| 7,290,525 B1* | 11/2007 | Kapsokavathis | F02D 29/02 123/329 |
| 8,355,833 B2* | 1/2013 | Koprubasi | B60L 15/2045 701/22 |
| 8,392,057 B2* | 3/2013 | Wright | B60L 15/20 701/31.7 |
| 9,004,206 B2* | 4/2015 | Kawaguchi | F02D 41/021 180/65.265 |
| 2003/0229429 A1* | 12/2003 | Zhang | B60K 6/48 701/22 |
| 2005/0050965 A1 | 3/2005 | Zaremba et al. | |
| 2008/0210509 A1* | 9/2008 | Fenkart | B60K 6/48 192/54.1 |
| 2012/0271493 A1 | 10/2012 | Gratton et al. | |
| 2012/0303196 A1* | 11/2012 | Kieser | B60K 6/48 701/22 |
| 2014/0121871 A1* | 5/2014 | Kim | B60K 6/442 701/22 |
| 2015/0006006 A1 | 1/2015 | Scheidle et al. | |

FOREIGN PATENT DOCUMENTS

| | | |
|---|---|---|
| EP | 1382818 A2 | 1/2004 |
| GB | 2304902 A | 3/1997 |
| JP | 2015196477 A | 11/2015 |

* cited by examiner

METHOD FOR ASCERTAINING AN ACCURACY OF A TORQUE TRANSMITTED BY A BELT-DRIVEN STARTER GENERATOR OF AN INTERNAL COMBUSTION ENGINE TO THE INTERNAL COMBUSTION ENGINE

CROSS-REFERENCE TO RELATED APPLICATIONS

The present application is the national stage of International Pat. App. No. PCT/EP2016/063688 filed Jun. 15, 2016, and claims priority under 35 U.S.C. § 119 to DE 10 2015 213 768.6, filed in the Federal Republic of Germany on Jul. 22, 2015, the content of each of which are incorporated herein by reference in their entireties.

FIELD OF THE INVENTION

The present invention relates to a method for ascertaining an accuracy of a torque transmitted by a belt-driven starter generator of an internal combustion engine to the internal combustion engine, as well as to an arithmetic unit and a computer program for implementing it.

BACKGROUND

Electric machines can be used in motor vehicles as so-called starter generators, in order, on one hand, to start the internal combustion engine during motor operation of the electric machine, and, on the other hand, to generate current for the vehicle electrical system and to charge the motor vehicle battery during generator operation of the electric machine. Such electric machines can be connected to the internal combustion engine or the crankshaft via a belt, for example, via the ribbed v-belt of the internal combustion engine (so-called belt-driven starter generators, BSG).

An example method for checking the plausibility of a drive torque applied by an electric machine in a hybrid drive of a motor vehicle is described in DE 10 2009 055 062 A1. In this context, it is checked if the drive torque applied by the electric machine is determined accurately. The method is based on a check as to whether the torque of the electric motor corresponds to the drag torque of the internal combustion engine.

SUMMARY

The present invention provides a method for ascertaining an accuracy of a torque transmitted by a belt-driven starter generator of an internal combustion engine to the internal combustion engine (torque accuracy), as well as an arithmetic unit and a computer program for implementing it.

In this context, torque accuracy is to be understood as how sharply a torque actually transmitted by the belt-driven starter generator (actual value of the transmitted torque) deviates from a specified torque to be transmitted (setpoint value of the transmitted torque). If the torque actually transmitted deviates from the specified torque more markedly than assumed, then the torque accuracy is viewed as not adequate or insufficient.

To ascertain the torque accuracy, a specified test torque is transmitted by the belt-driven starter generator to the internal combustion engine, while the engine is idling. This test torque is specified, in particular, as a set point value of a control system or a control unit of the belt-driven starter generator and/or of the internal combustion engine.

When the test torque is applied by the belt-driven starter generator, the torque generated by the internal combustion engine is reduced by the specified test torque. In the case of a sufficient torque accuracy, the specified test torque and the torque actually transmitted substantially match. In this case, a speed of the internal combustion engine does not change, but remains essentially constant at the value of the idling speed. In the case of insufficient torque accuracy, a torque, which is either greater than or less than the specified test torque, is actually transmitted by the belt-driven starter generator. In this case, the speed of the internal combustion engine is held constant at the idling speed, but rather the speed increases or decreases in this case.

In this case, the speed of the internal combustion engine constitutes a measure for being able to ascertain the torque accuracy. Therefore, a speed variable, which is a function of the speed of the internal combustion engine, is determined and evaluated. The torque accuracy is deduced from this evaluated speed variable. In particular, in response to decreasing or increasing engine speed, it is concluded that the torque actually transmitted by the belt-driven starter generator does not match the specified test torque, and that the torque accuracy is insufficient.

Using the present invention, deviations between the actual and setpoint torques of the belt-driven starter generator can be detected and also, in particular, corrected, in a low-outlay and cost-effective manner. In this context, it is not necessary to actually determine the torque of the internal combustion engine or of the belt-driven starter generator.

Such deviations can occur, for example, due to material and manufacturing tolerances of component parts, e.g., sensors, actuators, etc., or also due to effects of age and/or wear. For example, a structural change in the belt, e.g., elongation of the belt (in particular, due to aging of the conveyor cord) or wear of the belt (e.g., wear of the upper surface of the belt, in particular, of the ribs, through which the belt becomes longer for the belt drive) results in such deviations. Deviations can also occur on the basis of current environmental conditions, for example, due to the surrounding temperature.

These deviations can be detected by the method during continuous operation of the motor vehicle. It is not necessary to individually test the belt-driven starter generator or its parts, for example, in the course of normal service work in a garage, for effects of age and/or wear or for material and manufacturing tolerances. The torque accuracy can be ascertained, for example, in the course of any instance of idling of the motor vehicle, for example, any time the motor vehicle stands at a red light, or also after specified triggering events, e.g., for instance, one time per week, after every 100 hours of operation, or every 1000 km. However, the determination of the torque accuracy can also be activated as a service function, in order to learn the response of the motor vehicle to new vehicle parts (e.g., ribbed v-belts) in the scope of a repair.

If an inadequate torque accuracy is deduced, then the torque transmitted by the belt-driven starter generator is advantageously compensated for and/or corrected. For example, in the course of the correction, the specified test torque can be changed and the torque variable can be evaluated, until the torque accuracy is sufficiently high. In particular, the test torque is changed until the engine speed remains constant.

In particular, in the course of this correction, a correction factor, which indicates how much the torque actually transmitted and the specified torque differ from one another, can be determined. For example, this correction factor is yielded as the quotient of the test torque, at which a sufficiently high torque accuracy is deduced, divided by the test torque specified at the start of the method. This correction factor can then be applied to the torque to be transmitted.

Thus, manufacturing and material tolerances, as well as aging and/or wear effects, are implicitly taken into account, without undertaking complicated and cost-intensive repairs or mechanical actions in the process. In addition, a uniform quality of the belt-driven starter generator can be ensured. In particular, it is ensured, that in a boost-recuperation mode, a desired torque is transmitted precisely by the internal combustion engine to the belt-driven starter generator, in order to store energy in a battery, and that an overly high torque is not unintentionally transmitted, which can result in unwanted power losses of the internal combustion engine. In an analogous manner, it can be ensured that in the event of assistance to the internal combustion engine by the electric machine, a desired torque is transmitted by the belt-driven starter generator to the internal combustion engine. In particular, unwanted, sudden changes in torque are prevented from adversely influencing the driving feel.

For example, if the internal combustion engine takes the form of a diesel engine, then the belt-driven starter generator can be used for improving the self-cleaning of an $NO_x$ storage catalyst. In this case, the operating point of the diesel engine can be shifted to higher loads. Excess power can be recuperated by the belt-driven starter generator and stored temporarily in the battery. When required, the stored energy can be converted again into motive torque by "boosting." Using such dynamic torque assistance, a reduction of the $NO_x$ emissions inside the engine can be achieved. With the aid of the method, it can be ensured that high torque accuracy produces the corresponding, desired effect.

According to an example embodiment, the engine speed itself and/or an engine speed characteristic is determined as a speed variable. Principle-based, cyclical oscillations of the speed characteristic of an internal combustion engine can be taken into account, using suitable filters, in order that the speed is interpreted correctly along the lines of the method. However, other quantities can also be defined as a speed variable, for example, the torque or an oscillating frequency of the internal combustion engine and/or their characteristics. For the most part, the engine speed is already determined in the course of regular operation of the internal combustion engine, which means that additional sensors or computational operations are not necessary. Furthermore, an increase in the engine speed can be designated as a speed variable.

According to a preferred example embodiment, a statistical evaluation of a plurality of designated speed variables, which are collected, in particular, over a predetermined time interval, is carried out. In particular, in the event of a plurality of instances of idling of the internal combustion engine, in each case, a value for the speed variable is determined. For example, these different values for the speed variable are each stored in a storage area of a control unit. A mean of these individual values of the speed variable can be determined and evaluated. Therefore, temporary fluctuations in the torque accuracy due to, for example, varying engine temperature are identified, and only a long-term change in the torque accuracy is considered. In this manner, in particular, aging and/or wear effects of the belt can be deduced, such as elongation or wear of the belt. Preferably, a time series analysis of the plurality of determined speed variables is carried out. In particular, a trend or a trend line of the speed variable can be determined, using the time series analysis.

The results of the evaluation of the speed variable, that is, the evaluated speed variable, is advantageously checked for plausibility with the aid of statistical functions. Implausible measured values, which can occur due to uncontrollable boundary conditions such as temperature fluctuations, can therefore be detected and singled out and/or ignored.

An arithmetic unit of the present invention, e.g., a control unit of a motor vehicle, is, in particular, in the form of software, configured to implement a method of the present invention.

The implementation of the method in the form of a computer program is also advantageous, since this generates particularly low costs, in particular, if an implementing control unit is used for other tasks and is therefore already present. Suitable storage media for making the computer program available include, in particular, magnetic, optical, and electrical storage devices, such as hard drives, flash drives, EEPROMs, DVDs, etc. A download of a program via computer networks (Internet, intranet, etc.) is also possible.

Further advantages and refinements of the present invention are derived from the description and the accompanying drawing.

The present invention is represented schematically in the drawings in light of exemplary embodiments, and is described below with reference to the drawings.

DETAILED DESCRIPTION

Figure 1:
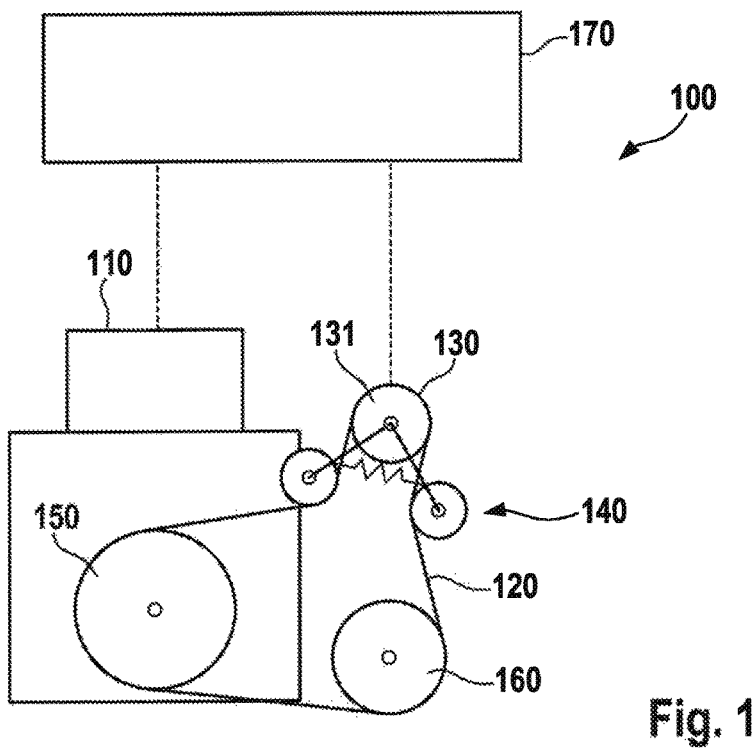
FIG. 1 schematically shows a belt drive of a motor vehicle, which includes an internal combustion engine and a belt-driven starter generator and which is configured to implement a method according to an example embodiment of the present invention.

In FIG. 1, a belt drive of a motor vehicle is schematically represented and denoted by 100. An internal combustion engine 110 of the motor vehicle includes a crankshaft, which is connected to a driven crankshaft wheel 150 in a rotatably fixed manner. Driven crankshaft wheel 150 takes the form of a belt pulley, for example.

Internal combustion engine 110 is connected to a belt-driven starter generator 130 via a belt 120, for example, via a ribbed v-belt, so as to be able to transmit a torque. Belt 120 engages, in particular, in a force-locked and/or form-locked manner, with driven crankshaft wheel 150 and with a drive wheel 131 of starter generator 130. Drive wheel 131 is connected to a rotor of starter generator 130 in a rotatably fixed manner. Internal combustion engine 110 can be connected by belt 120 to further components 160, such as fans or coolant pumps. In addition, a belt tensioner 140 can be provided, in order to pretension belt 120.

Figure 2:
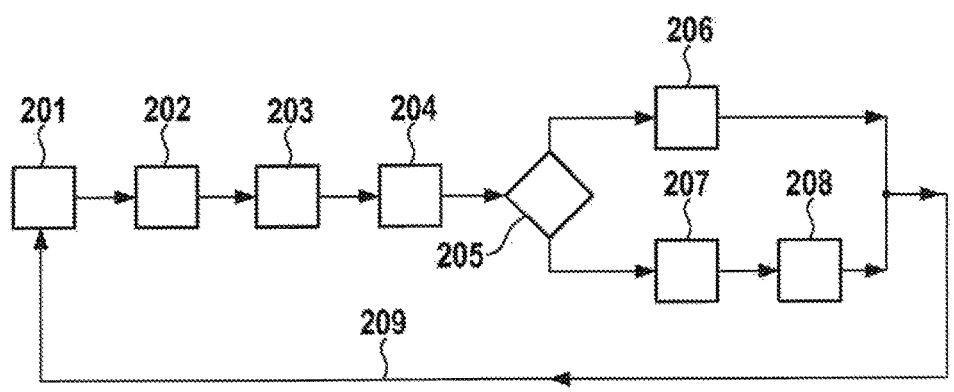
FIG. 2 is a flowchart that illustrates a method according to an example embodiment of the present invention.

A control unit 170 is configured to control internal combustion engine 110 and starter generator 130. In particular, control unit 170 is configured to implement a method according to an example embodiment the present invention, which method is schematically represented in FIG. 2.

In this context, the motor vehicle can be operated regularly in road traffic. In step 201, internal combustion engine 110 is idled, for example, because the motor vehicle comes to a stop at a red light or is parked. During idle, the engine speed can be 700 rpm (idling speed).

In step 202, a test torque of, e.g., 1 Nm is specified by control unit 170. Control unit 170 controls starter generator 130, in order that it transmit the specified test torque to the internal combustion engine via belt 120.

In step 203, control unit 170 controls internal combustion engine 110, in order to reduce its torque by the specified test torque of 1 Nm.

If the torque actually transmitted by starter generator 130 to internal combustion engine 110 corresponds to the specified test torque, then the engine speed should remain at least substantially constant at the idling speed of 700 rpm. If the torque actually transmitted (actual torque) and the specified test torque (setpoint torque) differ from one another, for example, due to aging and/or wear effects or material and manufacturing tolerances, then the engine speed changes.

In step 204, the speed of internal combustion engine 110 is therefore determined as a speed variable. In step 205, the determined engine speed is evaluated. In this context, it is checked, in particular, if the engine speed remains constant at the value of the idling speed of 700 rpm, or if the engine speed decreases or increases. From this, a torque accuracy of the torque transmitted by starter generator 130 to internal combustion engine 110 is deduced.

If the speed remains constant, then, in step 206, it is deduced that the torque accuracy is sufficiently high. If the speed decreases or increases, then the torque actually transmitted and the specified test torque differ from each other. In this case, it is concluded, in step 207, that the torque accuracy is not sufficiently high. In this case, then, in step 208, a correction of the torque transmitted by starter generator 130 is carried out. In this context, for example, the specified test torque is changed iteratively until the speed of internal combustion engine 110 remains constant and the torque accuracy is, consequently, sufficiently high.

In addition, a correction factor can be defined, which indicates how sharply the torque actually transmitted deviates from the specified test torque. For example, a quotient from the test torque, at which the engine speed remains constant, divided by the test torque that was specified according to step 202, is designated as a correction factor. In the future, this correction factor may be taken into account in the control of starter generator 130.

The method is aborted, in particular, if in steps 201 through 204, the engine speed changes on the basis of a driver request (e.g., drive off). In all cases, both in response to termination and in response to sufficient or insufficient torque accuracy, the method for ascertaining the torque accuracy is repeated, as soon as the motor vehicle is idled again, which is indicated by reference character 209. The engine speed, which is determined in specific step 204 and evaluated, can be stored in a storage area of control unit 170 and used for a time series analysis. In this manner, implausible measured values occurring due to uncontrollable boundary conditions can be detected with the aid of statistical functions and ignored.

Figure 3C:
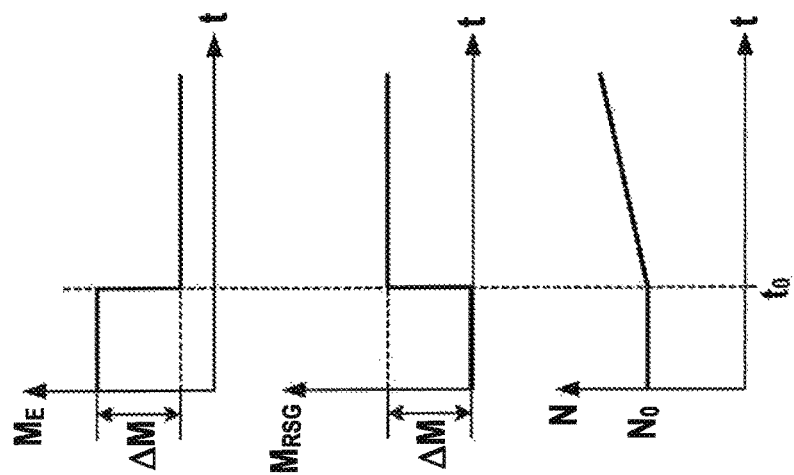
FIG. 3 schematically shows graphs of torques of an internal combustion engine and of a belt-driven starter generator, plotted versus time, as well as graphs of a speed of an internal combustion engine, plotted versus time, which can be determined in the course of execution of a method according to an example embodiment of the present invention.
Figure 3B:
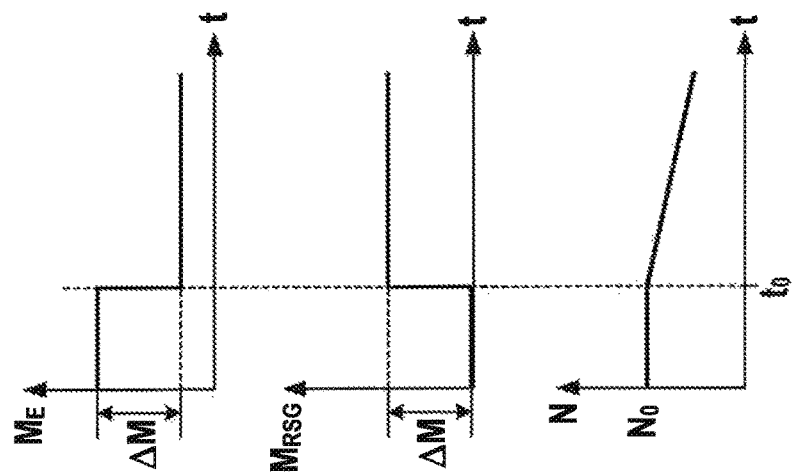
Figure 3A:
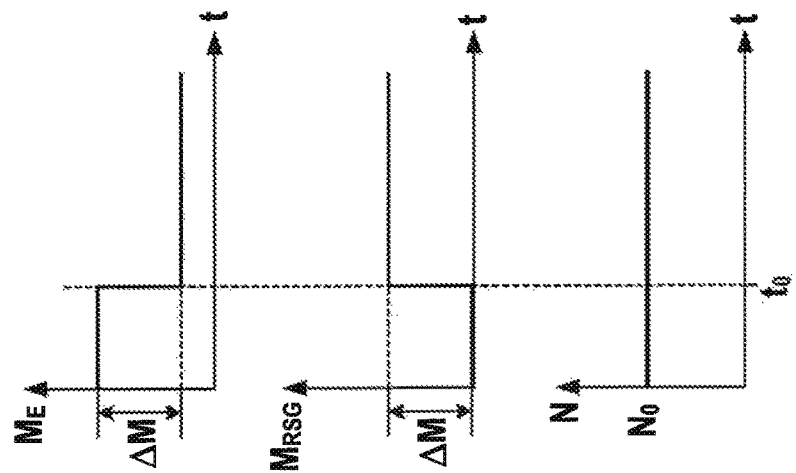

Graphs, which can be determined in the course of execution of the method according to an example embodiment of the present invention, are represented in FIG. 3. Three graphs are represented in each of FIGS. 3a through 3c. In each instance, torque $M_E$ of internal combustion engine 110, plotted versus time t, is represented in the upper graph. In each instance, torque $M_{RSG}$ of starter generator 130, plotted versus time t, is represented in the middle graph. In each instance, speed N of internal combustion engine 110, which is determined according to step 204, is plotted versus time t in the lower graph.

At time $t_0$, in each instance, torque $M_{RSG}$ of starter generator 130 is increased by test torque $\Delta M$ according to step 202, and in each instance, torque $M_E$ of internal combustion engine 110 is reduced by test torque $\Delta M$ of 1 Nm in accordance with step 203.

The case, in which the torque actually transmitted and specified test torque $\Delta M$ match and the torque accuracy is sufficiently high, and which is analogous to step 206, is represented in FIG. 3a. In this context, speed N of internal combustion engine 110 is also constant after time $t_0$ and remains at idling speed $N_0$ of 700 rpm.

The case, in which the torque actually transmitted is less than specified test torque $\Delta M$, and which is analogous to step 207, is represented in FIG. 3b. Consequently, the torque accuracy is insufficient. In this case, speed N of internal combustion engine 110 decreases after time $t_0$. The case, in which the torque actually transmitted is greater than specified test torque $\Delta M$, and which is analogous to step 207, is represented in FIG. 3c. In this instance, the torque accuracy is insufficient, as well. In this case, speed N of internal combustion engine 110 increases after time $t_0$.

What is claimed is:

1. A method for controlling a belt-driven starter generator of an internal combustion engine, the method comprising:
in an idling instance of the internal combustion engine:
controlling, by a processor, the belt-driven starter generator to provide to the internal combustion engine a specified test torque; and
controlling, by the processor, the internal combustion engine to decrease an actual torque of the internal combustion engine by the specified test torque;
determining, by a processor, a speed variable that is a function of a speed of the internal combustion engine resulting from the controlling of the belt-driven starter generator and of the internal combustion engine by the processor;
evaluating, by the processor, the speed variable;
deducing, by the processor and from the evaluation, a torque accuracy at which the belt-driven starter generator provides torque to the internal combustion engine relative to setpoints specified by the processor; and
based on the deduced torque accuracy, the processor controlling the belt-driven starter generator.

2. The method of claim 1, wherein the deduced torque accuracy is insufficient and the controlling based on the deduced torque accuracy includes correcting the torque transmitted by the belt-driven starter generator.

3. The method of claim 1, wherein in the course of the evaluation of the speed variable, it is determined if one of: the speed of the internal combustion engine remains constant and if the speed of the internal combustion engine deviates from a specified reference value.

4. The method of claim 3, wherein, in the course of the evaluation of the speed variable, it is determined that one of the speed of the internal combustion engine does not remain constant and the speed of the internal combustion engine deviates from the specified reference value, responsive to which determination an insufficient torque accuracy is deduced.

5. The method of claim 1, wherein a statistical evaluation of a plurality of determined speed variables is carried out.

6. The method of claim 5, wherein a time series analysis of the plurality of determined speed variables is carried out.

7. The method of claim 1, wherein the evaluated speed variable is checked for plausibility with the aid of statistical functions.

8. The method of claim 1, wherein the speed of the internal combustion engine is determined as a speed variable and is evaluated.

9. A non-transitory computer-readable medium on which are stored instructions that are executable by a processor and that, when executed by the processor, cause the processor to perform a method for controlling a belt-driven starter generator of an internal combustion engine, the method comprising:
  in an idling instance of the internal combustion engine:
    controlling the belt-driven starter generator to provide to the internal combustion engine a specified test torque; and
    controlling the internal combustion engine to decrease an actual torque of the internal combustion engine by the specified test torque;
  determining a speed variable that is a function of a speed of the internal combustion engine resulting from the controlling of the belt-driven starter generator and of the internal combustion engine by the processor;
  evaluating the speed variable;
  deducing, from the evaluation, a torque accuracy at which the belt-driven starter generator provides torque to the internal combustion engine relative to setpoints specified by the processor; and
  based on the deduced torque accuracy, controlling the belt-driven starter generator.

10. A device for controlling a belt-driven starter generator of an internal combustion engine, the device comprising:
  processing circuitry interfacing with the belt-driven starter generator and with the internal combustion engine, wherein the processing circuitry is configured to:
    in an idling instance of the internal combustion engine:
      control the belt-driven starter generator to provide to the internal combustion engine a specified test torque; and
      control the internal combustion engine to decrease an actual torque of the internal combustion engine by the specified test torque;
    determine a speed variable that is a function of a speed of the internal combustion engine resulting from the controlling of the belt-driven starter generator and of the internal combustion engine by the processor;
    evaluate the speed variable;
    deduce, from the evaluation, a torque accuracy at which the belt-driven starter generator provides torque to the internal combustion engine relative to setpoints specified by the processor; and
    based on the deduced torque accuracy, control the belt-driven starter generator.

* * * * *